Figure 1A:
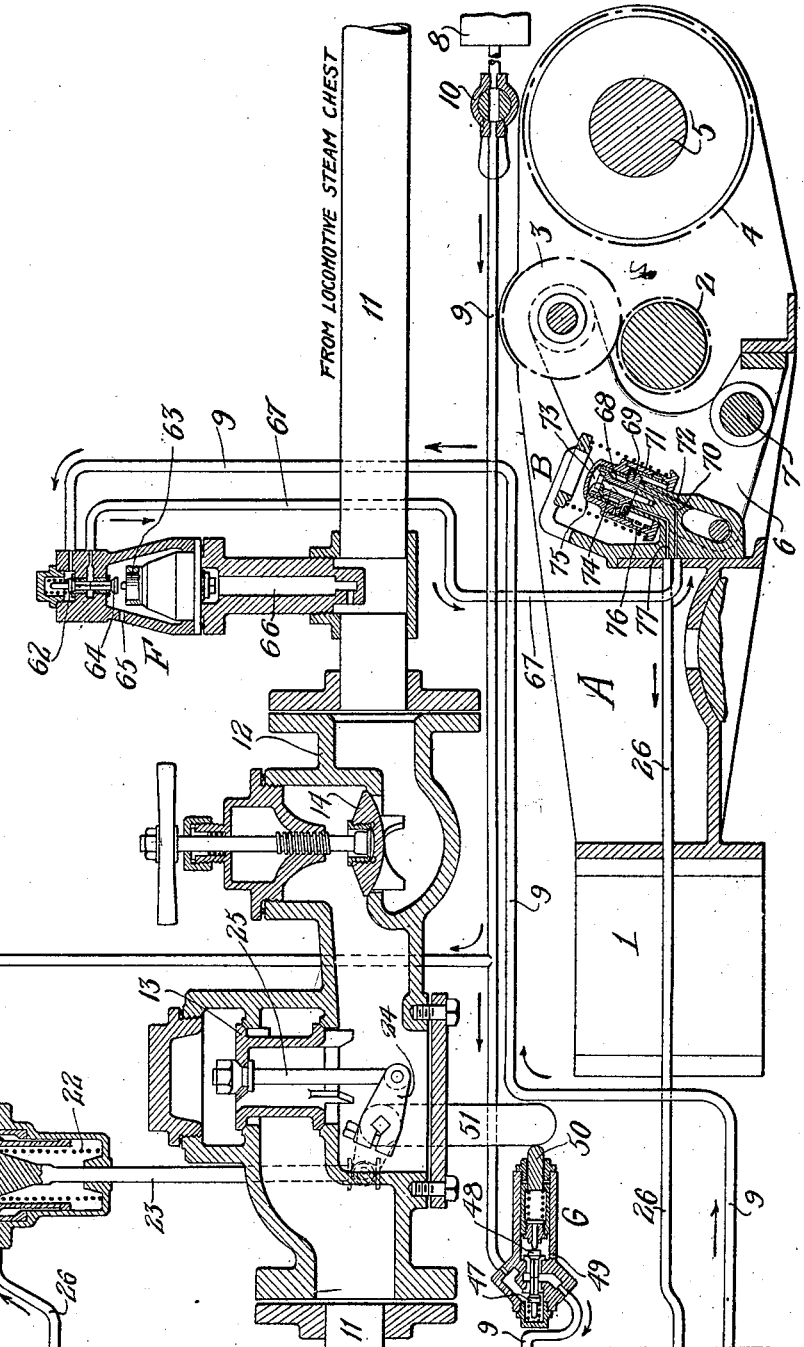

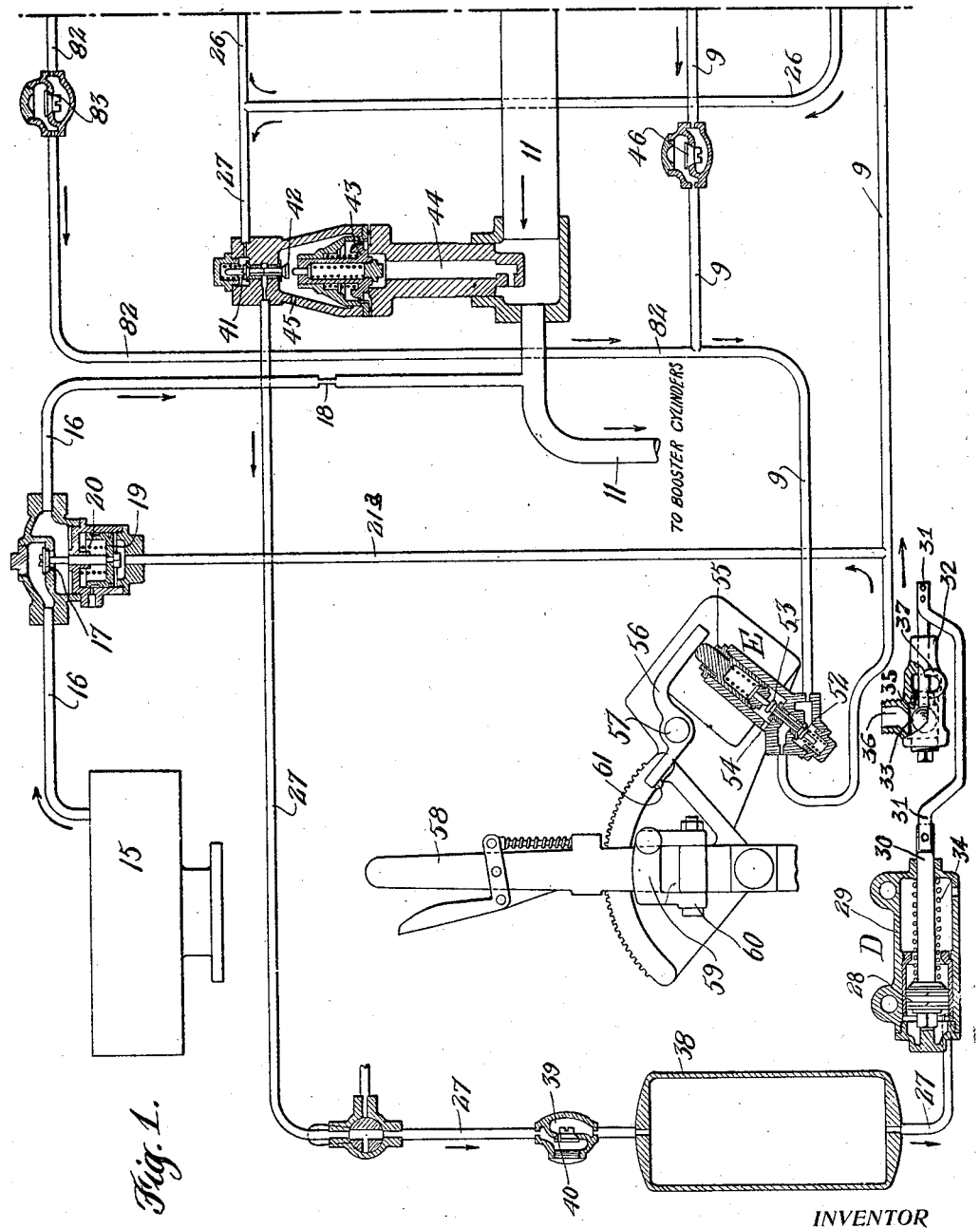

Jan. 1, 1929.　　　　　　　　　　　　　　　　　　1,697,638
C. C. FARMER
CONTROLLING MECHANISM FOR LOCOMOTIVE BOOSTER MOTORS
Filed Jan. 29, 1925　　　　2 Sheets-Sheet 2

WITNESS
Gustav Genzlinger

INVENTOR
Clyde C. Farmer
BY
Synnestvedt & Lechner
ATTORNEYS

Patented Jan. 1, 1929.

1,697,638

UNITED STATES PATENT OFFICE.

CLYDE C. FARMER, OF PITTSBURGH, PENNSYLVANIA, ASSIGNOR TO LOCOMOTIVE BOOSTER COMPANY, A CORPORATION OF DELAWARE.

CONTROLLING MECHANISM FOR LOCOMOTIVE BOOSTER MOTORS.

Application filed January 29, 1925. Serial No. 5,430.

This invention relates to locomotive booster motors such, for example, as are described and claimed in patent to Ingersoll No. 1,339,395, issued May 11th, 1920 and in the patent to Peters No. 1,470,761, issued October 16th, 1923.

It has particular reference to the controlling system for a booster motor.

Booster motors of the type herein illustrated, as is now well known in the art, are intended to assist the main locomotive in starting and at slow speeds but they are not intended to drive the locomotive by themselves nor are they intended to be operated at high speeds. They are preferably arranged to drive an axle either on the locomotive or on the tender but in so far as the present invention is concerned a location in one place or the other is entirely immaterial.

Because of the fact that a booster motor is not intended to be operative at all times it has been necessary to provide mechanism for entraining or disentraining it from the axle. Furthermore a throttle for controlling the supply of operating steam to the booster has been supplied together with a preliminary valve for admitting a small quantity of steam to the motor prior to actual operation as well as certain controlling mechanism for the booster cylinder cocks and certain pilot control valves.

Since it is desirable to reduce to the absolute minimum the amount of work and thought required on the part of the engineer in running the booster, controlling systems have been provided which automatically take care of the various steps in the operation of the booster. These have been subordinated, so to speak, to the control of the main engine so that the engineer has no burden with respect thereto except that which is involved in throwing the "booster latch" into or out of proper position for running the booster.

With the foregoing in mind a statement of the objects of my invention will be better appreciated. They involve in the first instance the provision of a controlling system for the general purpose above specified which will permit starting of the booster but at the same time prevent entrainment thereof or closure of the cylinder cocks until after the locomotive throttle is opened and the locomotive brought into operation.

Other objects and advantages will best appear from a consideration of the accompanying drawings and the following description thereof, the drawings being entirely diagrammatic in their arrangement.

In the drawings Figs. 1 and 1ª represent diagrammatically all the features of my invention and the two figures when placed side by side with Fig. 1 to the left will make a complete showing. The various parts show the apparatus in preferred form but they have been arranged, as stated, in a purely diagrammatic relation.

The cylinders 1 of the booster motor A are arranged to drive the pinion 2 and by means of the idler gear 3 this motion can be transmitted to the gear 4 fixed to the axle 5 which it is desired to drive. The gear 3 is at all times in mesh with the pinion 2 and can be thrown into or out of mesh with the gear 4 by virtue of the fact that it is mounted upon a rocking member 6 pivoted at the point 7. A small motor device indicated as a whole by the character B is supplied for the purpose of moving the rocking member 6 and the booster is said to be entrained when the idler gear meshes with the gear 4 on the axle and to be disentrained when the idler gear 3 is retracted as shown in the drawing Fig. 1ª. The motor B is preferably operated by compressed air as will appear more fully hereinafter, the air being supplied for this motor as well as for the entire booster motor controlling system from the compressed air tank 8. The supply line 9 from the tank 8 is supplied with a cut-out cock 10.

The booster cylinders are supplied with operating steam through the pipe 11 which I prefer to connect to the steam chest of the locomotive so that there will never be any steam delivered to the booster until after the locomotive throttle is opened and the engine is in operation.

A suitable fitting or casting 12 is introduced into this pipe 11 in which are arranged the booster throttle valve 13 and a hand operated cut-out valve 14 for use in shutting off the supply of steam in case of emergency or for purposes of repair, the latter being, of course, between the steam chest and the booster throttle 13.

Arrangements are made for the supply of a preliminary quantity of steam to the booster motor, the same coming from the turret 15 thru pipe 16 which enters the pipe 11, the flow thru the pipe 16 being under the control of what is known as the preliminary booster throttle valve 17. A restriction 18 is preferably employed in the pipe 16 so that only enough steam can pass to accomplish what is known as "idling" of the booster. This idling is very essential since the booster is not run at all times and must be cleared of all water of condensation and thoroughly warmed up before it is entrained.

The preliminary throttle 17 is opened by air pressure acting on the piston 19 against the force of a spring 20, the air entering thru the pipe 21ª. The main booster throttle is opened by air pressure on the piston 21 in the throttle operating cylinder C. In descending the piston 21 works against the pressure of spring 22 and the piston rod 23 moves the left hand end of the rocking lever 24 downwardly on its pivot and at the same time moves the right hand end upwardly to lift the stem 25 of the booster throttle 13. The air pressure is delivered to the surface of the piston 21 through the pipe 26 which latter it will be noted is directly connected to the entraining motor B and at this point it might profitably be stated that no air can pass through the pipe 26 to depress the piston 21 and open the booster throttle valve 13 until after the gear 3 has been entrained with the gear 4.

The supply of air for opening the booster throttle 13 as just described is tapped into for the performance of an additional function, namely, the closure of the booster cylinder cocks. This air is taken through the pipe 27 to a small motor D comprising a piston 28 in a cylinder 29. The piston rod 30 is suitably connected to the pin 31 which extends into the cylinder cock 32 so as to project directly in the path of the ball valve 33 and it will be seen that when the booster is not in operation and no air is delivered to the face of the piston 28 the spring 34 in the motor D will hold the pin 31 in position to prevent the ball valve 33 from seating against its seat 35. In other words the cylinder cock is normally open and, in fact, is positively held in open position at all times when the booster is not in operation. The water of condensation enters through the connection 36 and is drained or blown out through the opening 37. It will be understood of course that I have shown but one of the cylinder cocks which are ordinarily used on the booster cylinders. The others operate in exactly the same manner and are suitably interconnected to work in unison through the medium of the single motor D. A timing reservoir 38 and a check valve 39 are interposed in the pipe 27 and in the check valve 39 is a small bleed port 40 through which pressure can be exhausted from the face of the piston 28 through the pipe 27.

The pipe 27 is also subject to the control of the valves 41 and 42. No air can reach the face of the piston 28 while the valve 41 is in its downward or normal position but just as soon as there is pressure of operating steam in the pipe 11 the piston 43 moves upwardly to seat the valve 42 and open the valve 41, the pressure of the steam being admitted to the piston 43 through the passage 44. When there is no operating pressure of steam in the pipe 11 the valve 41 will close and the valve 42 will open so that exhaust from the face of the piston 28 may take place through the bleed port 40 in the check valve 39, pipe 27 and exhaust port 45.

The compressed air for accomplishing the various functions so far described is supplied, as stated, from the reservoir 8 through the pipe 9 and the flow through the pipe is subject to the control of two independent valves, the first of which I have termed the supply control valve G and the second of which is known as the reverse lever pilot valve E. Between the two valves there is a check valve 46.

The supply control valve G includes the small valve 47 which controls the passage through the pipe 9 and the small valve 48 which controls the exhaust port 49. Under normal conditions when the booster is not operating as a driving unit the valve 48 is held to its seat and the valve 47 is held in open position by means of the plunger mechanism 50 which in turn is acted upon by the lever or arm 51 fixedly attached to the pivot of the lever 24 so that it moves upon actuation of said lever 24 to open the booster throttle 13. It will therefore be seen that when the booster throttle 13 is opened flow through the pipe 9 will be cut off by virtue of the fact that the lever 51 will release the plunger 50 and permit valve 47 to close and valve 48 to open.

The reverse lever pilot valve E is a duplicate of the supply control valve. Its small valve 52 controls the flow of air through the pipe 9 and its small valve 53 controls the exhaust through the opening 54. Its plunger mechanism 55 is adapted to be pressed downwardly by means of the lever 56 pivoted at the point 57.

When the engineer desires to use the booster the reverse lever 58 is always moved forwardly to some position near the forward corner and when in this position the lever 56 may be actuated to depress the plunger 55 by means of the so called booster latch 59 which is pivoted to swing upwardly and downwardly on the pivot 60. When the latch is raised as shown in Fig. 1 and the reverse lever 58 pushed forwardly as described it will engage the abutment 61 on the left hand end of the lever 56 thereby raising such end and lowering the opposite end to depress the plunger 55. Whenever the latch is pulled downwardly on its pivot 60 or the reverse lever 58 is pulled back sufficiently to bring it out of engagement with the point 61 the pilot valve will, of course, operate to shut off the air supply to the booster controlling system and the booster will consequently be cut out or disentrained. In other words the valve E is distinctly a pilot means for the entire booster system.

If the pilot valve E is set to throw the booster system into operation compressed air will flow on through the pipe 9 to the valve F which I have termed the clutch cylinder control valve. Here further progress of the air is blocked by means of a valve 62 but just as soon as there is pressure of steam in the pipe 11 which is connected to the locomotive steam chest the piston arrangement 63 will be raised to open valve 62 and at the same time seat valve 64, the seating of the latter valve closing off the possibility of flow of air through the exhaust port 65. The pressure of the stream from pipe 11 reaches the under face of piston 63 thru the passage 66. Just as soon as the valve 62 is opened the compressed air will continue through the pipe 67 down to the entraining motor B already briefly described. When this happens the pressure enters the chamber 68 above the stationary piston 69 through the duct 70 to which pipe 67 is connected. The cylinder 71 in which the piston 69 is located is adapted to move upwardly and downwardly on said piston and is provided with an exhaust port 72. The air passes from the chamber 68 into the space 73 above the smaller upper end 74 of the piston 69 through a port 75. The cylinder 71 is thus raised to entrain the idler gear 3 with the gear 4 and when by-pass 76 comes to the top of the stroke it establishes communication between chamber 68 and duct 77, the latter communicating with the pipe 26 previously described.

After the locomotive has begun to operate and entrainment of the booster has taken place the air then continues thru the pipe 26 as previously described to the throttle operating cylinder C in order to open the booster throttle 13 as previously indicated. It will be seen that the moment that this takes place the flow of air thru the pipe 9 will be shut off by virtue of the fact that the lever 51 will be moved away from the plunger 50. In order to continue the flow of air to the system I have therefore provided the following apparatus.

Above the piston 21 is another piston 78 and valve mechanism 79 and 80 just like the piston 63 and valve device 64, 62 of the clutch cylinder control valve F. At the same time that the air coming through pipe 26 forces piston 21 downwardly to open the booster throttle it also moves the piston 78 upwardly to seat valve 79 and open valve 80, the valve 79 controlling the exhaust through port 81 and the valve 80 controlling the flow of compressed air through the pipe 82. The pipe 82 receives its pressure from the pipe 9 at a point in advance of the supply control valve G and discharges back into the pipe 9 at a point between the supply control valve and the reverse lever pilot valve E but on the far side of the check valve 46 so that said check valve will prevent flow in the reverse direction to pipe 9. There is also a check valve 83 in the pipe 82 which, as is apparent from the drawing, prevents air from flowing in the reverse direction through pipe 82 when the normal supply of air is being delivered thru the pipe 9.

A summary of the entire operation would therefore be as follows assuming that the engineer is starting the locomotive from a dead stop and that he desires to use the booster. The reverse lever as usual is first placed in the forward corner and by means of the booster latch 59 the reverse lever pilot valve E is set to throw the booster controlling system into condition to function. The compressed air enters the system from the tank 8 and its first effect is to open the preliminary throttle valve 17. The booster then idles and will continue to idle up until the time that the locomotive throttle is open and the locomotive begins to operate. The steam pressure for idling the booster is just enough to keep the gear 3 in motion and sufficient to clean the booster cylinders of water of condensation the same being blown out through the booster cylinder cocks 32. It will therefore be seen that the booster cylinder cocks will remain open until such time as the locomotive begins to operate. Just as soon as the locomotive begins to operate and there is pressure of steam in the pipe 11 the clutch cylinder control valve F will function to permit the air to reach the entraining motor B and, as already described, just as soon as entrainment of the gears 3 and 4 takes place the air will continue to the throttle operating cylinder C and also up to the pilot valve 41 which controls the flow of air to the cylinder cock mechanism.

The booster throttle 13 will then be opened and full operating steam pressure will pass down thru the pipe 11 to cause the booster to become a driving factor. Just as soon as this full operating pressure develops in the pipe 11 the valve 41 will be opened and the air will be permitted to reach the cylinder cock mechanism, as previously described. It will therefore be seen that even after the locomotive has begun to take steam there is still a slight additional delay before the booster cylinder cocks are allowed to close, the timing reservoir 38 also being introduced for purposes of delay in the closing of the cylinder cocks.

It will therefore be seen that I provide a controlling system for locomotive booster motors which will permit idling of the booster prior to the time that the booster can be entrained and prior to the time that the booster cylinder cocks can be closed I have provided a pilot valve for controlling all of the functions of the booster motor controlling system and in said system I have provided a steam actuated pilot valve (clutch cylinder control valve F) for controlling the operation of the entraining motor B, the throttle operating cylinder C and the cylinder cock mechanism. It will further be seen that the cylinder cock mechanism is subordinated to a still further pilot control means in the shape of the valve 41. I have also provided a control means for the system in the shape of the supply control valve G which is under the influence of the operating mechanism for the booster throttle 13. I therefore make it possible to thoroughly warm up the booster engine and clear it of water of condensation prior to the time that it is to become a driving factor and I also arrange for having the idler gear 3 moving at all times when entrainment takes place. This helps to avoid clashing of the gears with its incidental damage.

I claim:—

1. The combination of a locomotive, a normally disentrained booster motor therefor, normally open cylinder cocks for the booster motor, and means automatically entraining the motor and permitting closure of the cylinder cocks, said means being inoperative until after the locomotive is operated.

2. The combination of a locomotive, a normally disentrained booster motor therefor, air pressure actuated means automatically entraining the booster motor, said means being inoperative until after the locomotive is operated, and means for idling said motor prior to entrainment.

3. The combination of a locomotive, a normally disentrained booster motor therefor, air pressure actuated means automatically entraining the booster motor, said means being inoperative until after the locomotive is operated, means for idling said motor prior to entrainment, and means automatically delivering full operating pressure of steam to the booster motor subsequent to locomotive operation.

4. A locomotive booster motor controlling system comprising in combination, a normally disentrained booster motor, air pressure actuated means for entraining the motor, said means being inoperative until after the locomotive is receiving steam, and means for idling the motor at will prior to entrainment.

5. A controlling system for normally disentrained locomotive booster motors comprising in combination, a normally open booster cylinder cock, means for delivering full operating pressure of steam to the booster, and means under the control of said pressure passing to the booster for permitting closure of the cock.

6. A controlling system for normally disentrained locomotive booster motors comprising in combination, booster entraining mechanism, means for delivering full operating pressure of steam to the booster, means for idling the booster, and a pilot means for the system, all of said means in the system being subject to the control of said pilot means and the entraining mechanism together with the means for delivering full operating pressure to the booster being additionally under the control of the locomotive so as not to function when the locomotive is not being operated, the means for idling the booster, however, being free to function continuously under the control of the pilot means regardless of locomotive operation.

7. A controlling system for normally disentrained locomotive booster motors comprising in combination, an air pressure actuated booster entraining mechanism under the control of the locomotive, and means for idling the booster prior to entrainment.

8. The combination of a steam locomotive, a normally disentrained booster motor therefor, fluid pressure actuated mechanism for entraining said booster, booster cylinder cocks normally maintained in open position, fluid pressure actuated mechanism for permitting closure of said cocks, and means disabling the entraining mechanism and for continuing the cylinder cocks in open position until after the locomotive is taking steam.

9. A locomotive booster motor controlling system comprising, in combination with the locomotive throttle, a preliminary booster throttle, a main booster throttle, means under the control of the main booster throttle for opening the preliminary booster throttle and means under the control of the locomotive throttle for opening the main booster throttle.

10. In a controlling mechanism for booster motors for steam locomotives, the combination of an entrainment mechanism for the booster, an air pressure system in control thereof, means normally cutting out said system, and means for disabling said cutting out means, said last means being actuated by the steam for driving the locomotive.

11. A locomotive booster motor controlling system comprising, in combination with the locomotive throttle, an air pressure actuated booster entraining mechanism, means for starting operation of the booster prior to booster entrainment and prior to the opening of the locomotive throttle, and means for effecting said entrainment of the booster and for causing its continued operation after the opening of the locomotive throttle.

12. A locomotive booster motor equipment of the character described comprising in combination, an air reservoir; a reverse lever pilot valve; a booster throttle; booster entraining mechanism; booster cylinder cocks; an air supply control valve between the reservoir and the reverse lever pilot valve; means associated with the booster throttle for holding said air supply control valve in open position while said throttle is closed; means for starting operation of the booster motor upon actuation of the reverse lever pilot valve; and means for causing entrainment of the booster, for permitting closure of the booster cylinder cocks, and for opening the booster throttle all functioning after the locomotive has begun to use steam.

13. Locomotive booster apparatus comprising in combination, a normally disentrained, steam-actuated booster motor, a throttle valve for the booster steam supply, a fluid motor for entraining said booster, a conduit for supplying the pressure to actuate said entraining motor, and a valve in said conduit which is held in open position by said throttle when said throttle is closed but which will be moved to closed position when said throttle is open.

14. Locomotive booster apparatus comprising in combination, a normally disentrained, steam-actuated booster motor, a throttle for the booster steam supply, a fluid motor for opening said throttle, a fluid motor for entraining the booster, a conduit for supplying the pressure to actuate said entraining motor and said throttle opening motor, a valve in said conduit which is held in open position by said throttle when said throttle is closed but which will be moved to closed position when said throttle is open, a normally closed by-pass around said conduit valve, and means which opens said by-pass when the throttle is being opened.

15. Locomotive booster motor equipment comprising in combination, a fluid pressure controlling system, two conduits thru which the fluid pressure can enter the system, a booster throttle, a valve in one of said conduits normally held in open position by the throttle when said throttle is closed, a normally closed valve in the second conduit, and means for opening the valve in said second conduit and for closing the valve in said first conduit when the booster throttle is being opened.

16. Locomotive booster motor equipment comprising in combination, a fluid pressure controlling system, two conduits thru which the fluid pressure can enter the system, a booster throttle, a fluid pressure motor for opening said throttle, a valve in one of said conduits normally held in open position by the throttle when said throttle is closed, a normally closed valve in the second conduit, and means for opening the valve in said second conduit and for closing the valve in said first conduit when the booster throttle is being opened, the valve in said second conduit, however, closing should the booster throttle stick in an open position after discontinuance of the supply of fluid pressure which effected its opening.

In testimony whereof, I have hereunto signed my name.

CLYDE C. FARMER.